INVENTOR.
RENIC P. VINCENT
BY Arthur McElroy
ATTORNEY

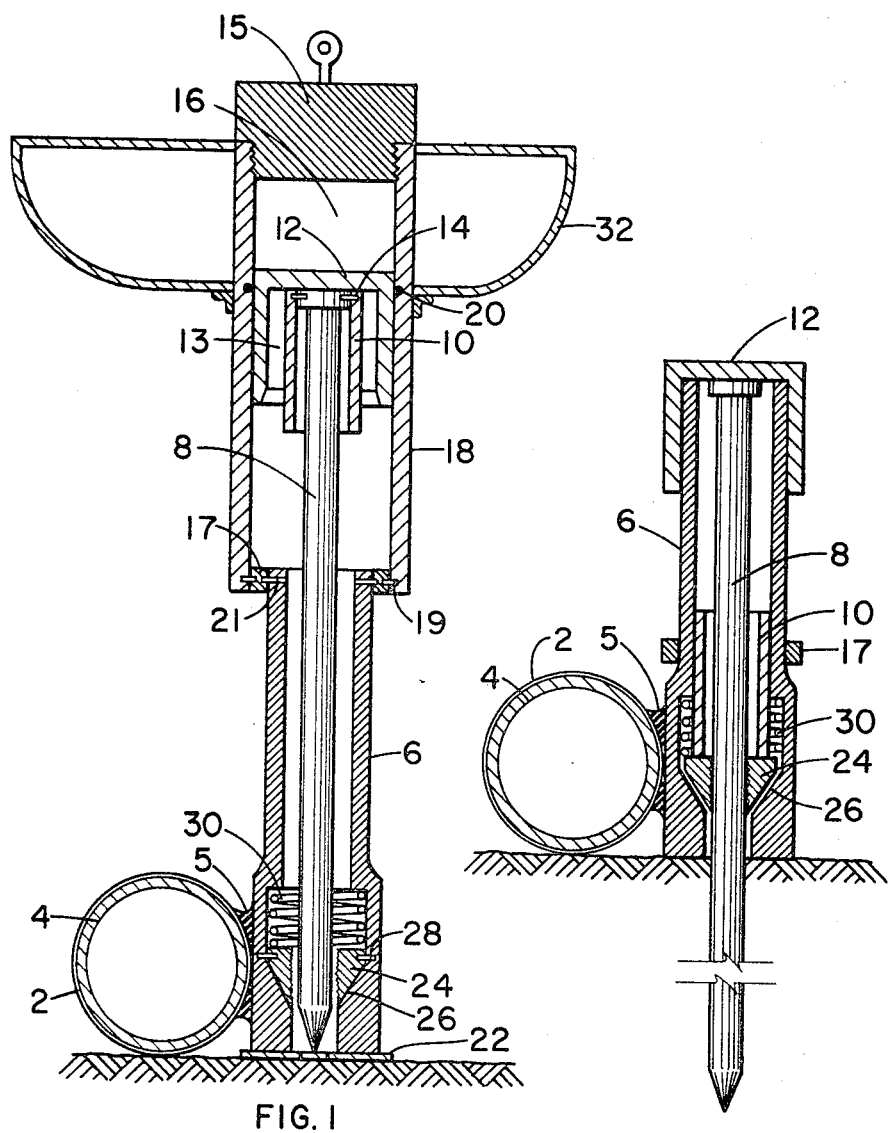

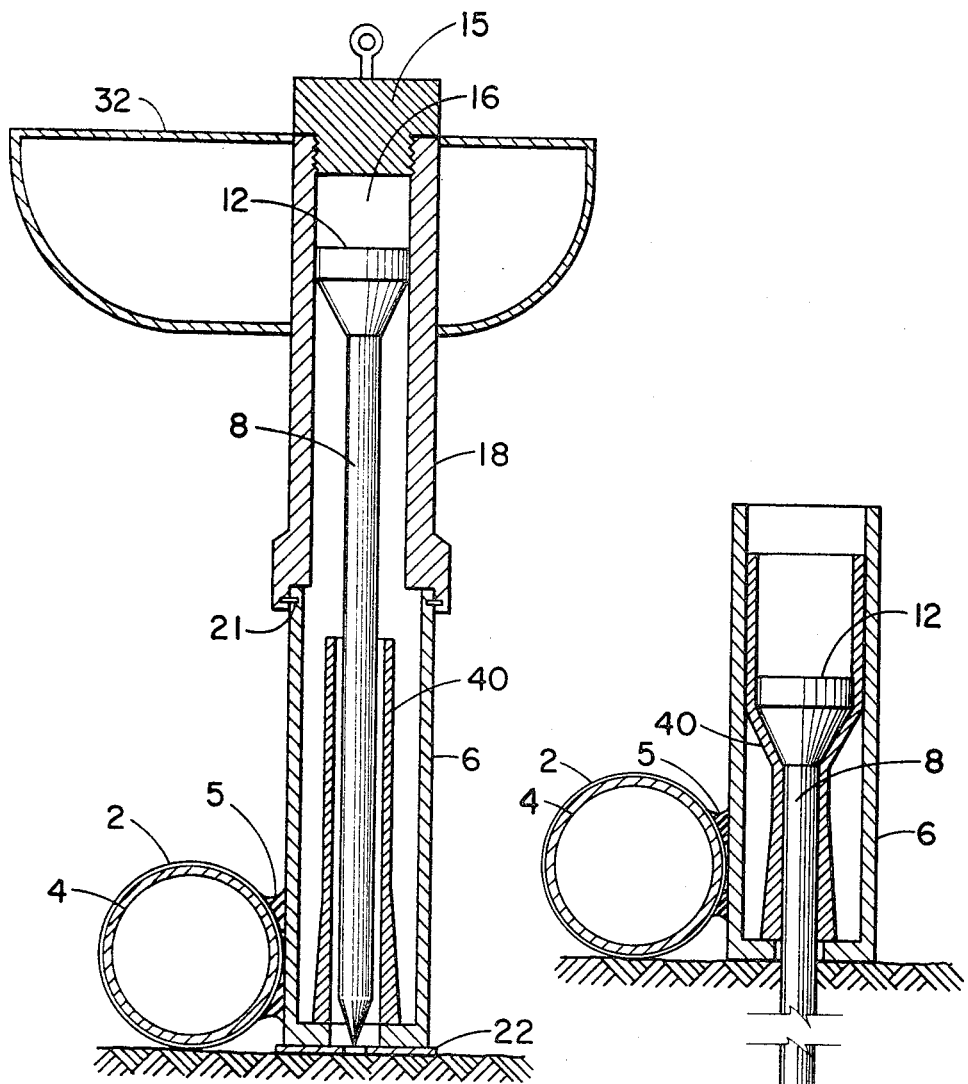

Sept. 3, 1968             R. P. VINCENT            3,399,646

SUBMARINE ANCHOR ASSEMBLY

Filed Aug. 14, 1967            4 Sheets-Sheet 4

INVENTOR.
RENIC P. VINCENT
BY
ATTORNEY

United States Patent Office 3,399,646
Patented Sept. 3, 1968

3,399,646
SUBMARINE ANCHOR ASSEMBLY
Renic P. Vincent, Tulsa, Okla., assignor to Pan American Petroleum Corporation, Tulsa, Okla., a corporation of Delaware
Filed Aug. 14, 1967, Ser. No. 660,525
11 Claims. (Cl. 114—206)

ABSTRACT OF THE DISCLOSURE

An explosively driven submarine anchor assembly suitable for securing pipelines to the ocean floor comprises an explosively driven nail surrounded by a tubular member having a deceleration means therewithin to prevent the nail from passing entirely through the assembly and into the ocean floor. Affixed to the tubular member is a clamping means suitable for securing a pipeline to the anchor body. Means may also be used in the base of the aforesaid tubular member for preventing upward movement of the nail after it has been driven. The gun barrel(s) used in firing the nail is affixed to an air tank which causes the firing mechanism to automatically rise to the surface after the firing step has been completed.

---

The present invention relates to explosively driven anchors suitable for securing a pipeline or similar conduit to the bottom of a river, inlet or other bodies of marine or fresh water where a substantial current is present. More particularly it is concerned with a novel anchor capable of preventing both lateral and vertical movement of a submerged pipeline comprising a clamp adapted to fit over said pipeline and held in place on the ocean floor, for example, by means of an elongated fastener running through said clamp.

*Background of the invention*

Pipelines located at the bottom of bodies of water having a substantial current, e.g., 5 to 10 knots per hour, if not properly anchored or weighted, can fail owing to fatigue caused by movement of the line. This condition is particularly severe in areas such as Cook Inlet, Alaska, where operators are faced with 30 ft. tides which change every six hours, and reversing tidal currents of 5 to 8 knots per hour. The forces generated under these conditions not only cause a reversing lateral movement of the pipeline but in some cases—particularly where a section of the line spans a gorge or hollow—the line tends to flutter or vibrate. This eventualy results in fatigue and rupture of the pipeline. A number of solutions have been proposed in an effort to overcome these problems. However, none of them have met with unqualified success. For example, it has been suggested that the line be weighted with a cement sheath to insure against movement by currents but the problems of laying such a weighted line are formidable, particularly where it is desired to lay the line in deep water. In such cases the stresses developed are sometimes sufficiently severe to fracture the cement sheath. Even if the line is placed on bottom without damage to the outer cement layer the magnitude of the currents often is sufficiently great to cause pipeline flutter and the problems typically resulting therefrom. To prevent flutter in such lines "spoilers" an inch or so in height going in a helical pattern around the pipe have been used. However, the advantages of such measures have not been established.

*Brief description of the invention*

I have now developed an improved explosively driven anchor, with retrievable firing means, adapted to secure pipelines and similar conduit to the bottom of bodies of water in the presence of undesirable conditions. This anchor comprises a ring adapted to be fitted on to the pipeline. This ring is welded or otherwise affixed to a hollow cylindrical member which in effect is an extension of a gun barrel holding a portion of an elongated explosively drivable projectile. Also in the hollow cylindrical member is a means for decelerating said projectile to prevent it from being completely driven on into the ocean floor, or similar location, when the apparatus is fired. Integral with the upper extremity of said projectile is a piston-like head adapted to cooperate with the deceleration means to prevent the projectile from entirely burying itself in the ocean floor. On top of the projectile head there is placed a power charge suitable for generating, for example, from 100,000 to about 500,000 ft. pounds of energy. The firing chamber at the top of said piston for the aforesaid charge is formed by the top and walls of a gun barrel extending for a substantial distance, e.g., 3½ to 4 feet. Affixed to the upper extremity of the gun barrel is a buoyant means which serves to bring the barrel and firing mechanism automatically to the surface once the anchor assembly has been secured to the marine floor. A further advantage of such means is that in laying the pipeline in offshore locations the anchor is automatically maintained in vertical alignment with respect to the pipeline when fired. Also by affixing such buoyant means to the pipeline before it is lowered to bottom the necessity for sending a diver to inspect or adjust the assembly prior to firing is avoided. This improvement extends substantially the depth—even beyond conventional diver working depths—at which the anchor assembly can be used.

My invention may be further illustrated by reference to the accompanying drawings wherein FIGURE 1 shows my novel anchor assembly before firing and affixed to a section of pipeline.

FIGURE 2 shows the assembly illustrated in FIGURE 1 after firing of the projectile has taken place.

FIGURE 3 illustrates another embodiment of deceleration mechanism that may be used in combination with projectile body having a tapered head.

FIGURE 4 shows the portion of the projectile within the lower portion of the anchor assembly after firing.

Figure 5:
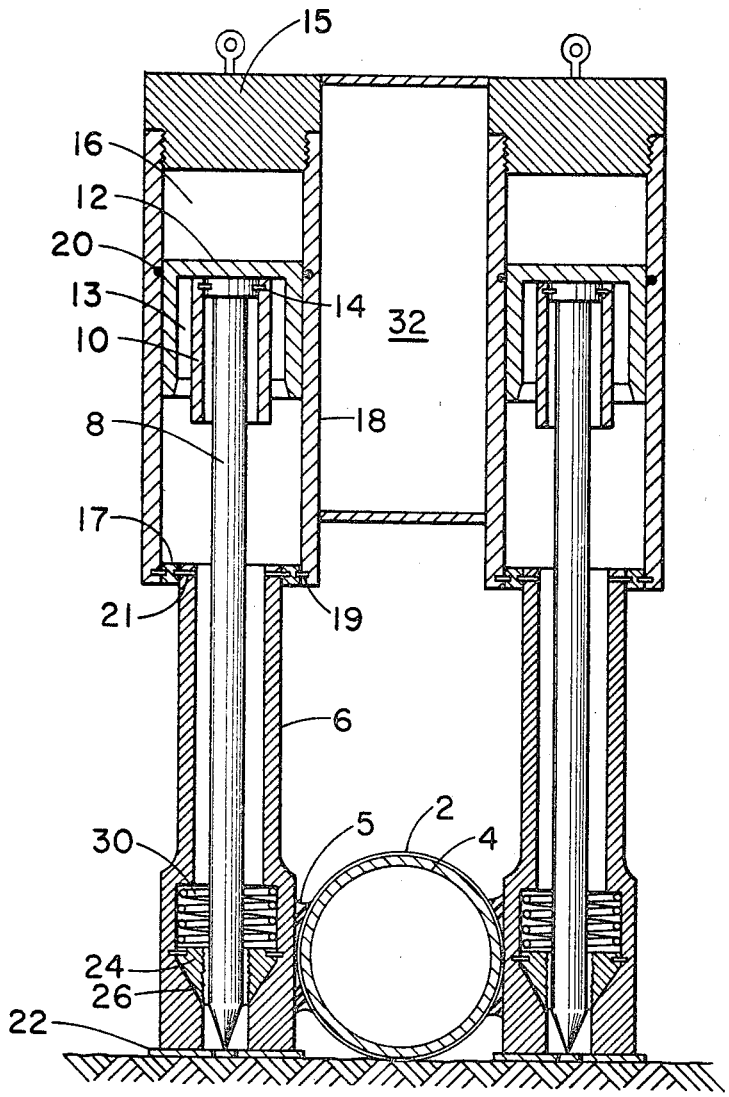
FIGURE 5 is a design of anchor assembly coming within the scope of my invention wherein a double gun barrel arrangement is employed using separate but simultaneously fired charges.

Referring now to FIGURE 1, the anchor assembly and associated equipment includes an annular member 2 which may be continuous or bolted together around a section of pipeline 4. Member 2 is welded at 5 to a hollow cylindrical support member 6 holding projectile 8 which has just below head 12 tubular weight 10 extending downwardly a short distance, e.g., about 1 foot, from the lower portion of projectile head 12 and is secured to projectile 8 either by shear pins 14 or by a light press fit. A firing chamber 16 is formed by the upper end of gun barrel 18 and the walls thereof in combination with head 12. O-ring 20 serves to maintain a tight seal between the sides of head 12 and the walls of the gun barrel. At the lower end or muzzle of barrel 18 a ring 17 is inserted and held in place by shear pins 19. In turn, tubular member 6, which is in effect an extension of gun barrel 18, is affixed to said barrel by means of shear pins 21. At the lower extremity of hollow member 6 is a shear plate 22 which prevents the entry of water into the interior of the anchor assembly prior to firing. Immediately above plate 22 are slips 24 resting on tapered shoulders 26 of cylindrical member 6 and held in place by shear pins 28. Resting on slips 24 is a compressed coiled spring 30. Affixed to gun barrel 18 is an air tank 32 having its center of buoyancy essentially over the center of pipeline 4 so as to place projectile 8 in a substantially vertical position with respect to the ocean floor when the gun is fired. This sometimes will result in an unbalanced appearing structure as shown in the drawing.

The apparatus shown in FIGURE 3 has a projectile 8 with a tapered head 12 adapted to slide into deceleration tube 40 expanding the latter against hollow tubular member 6 to effect a tight fit therewith. Member 6 is affixed to the lower end of gun barrel 18 by means of pins 21 which are sheared when the gun is fired permitting the gun barrel to free itself from the anchor assembly and rise to the surface through the lifting force of air tank 32.

FIGURE 5 illustrates a double barreled retrievable assembly having an air tank 32 on each side of which is a separate firing mechanism affixed to an exterior portion of of barrels 18 by means of welding, lock screws, or the like. As will be recognized this modification is essentially the same as the structure shown in FIGURE 1 except for the difference in air tank design owing to the use of two anchors and firing mechanisms in place of one. Simultaneous firing of the explosive charges in chambers 16 is effected by the use of an electrical system employing electrically fired squibbs with the two projectiles 8 being driven into the soil and secured in the same fashion as described in connection with FIGURES 1 to 4. After firing, the two barrels 18 are brought to the surface by means of air tank 32.

Figure 6:
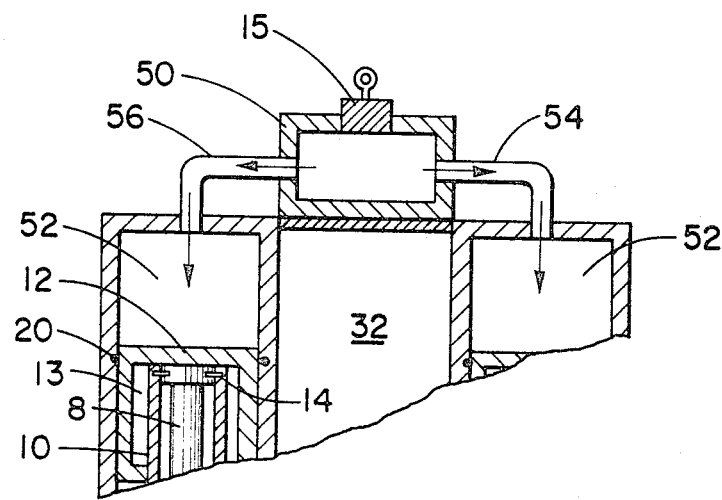
FIGURE 6 is a fragmentary view of a variation of FIGURE 5 wherein a single charge is used to propel both projectiles into the marine floor.

FIGURE 6 differs slightly from the assembly shown in FIGURE 5 wherein a common firing chamber 50 is substituted for the individual chambers 16, the gases generated by the explosion in the chamber 50 being introduced into chambers 52 immediately above projectile heads 12 by means of conduits 54 and 56. The powder charge may be set off by the use of an electrically fired squibb (not shown), or equivalent device, operated by means of a firing wire inserted through threaded breech plug 15.

In describing the operation of my invention reference to various embodiments shown in FIGURES 1 to 6 will be made. The assembly is attached to a pipeline 4, or section thereof, at the surface by means of band 2 which is welded to tubular member 6 at 5. The fit between band 2 and the pipeline should be sufficiently loose so that the assembly can right itself with respect to the pipeline when submerged. After the assembly has reached bottom the explosive firing chamber 16 (50 in the case of FIGURE 6) is initiated by means of an electrically fired squibb, driving projectile 8 downward through shear plate 22 and into the marine floor. Barrel(s) 18 separates from tubular member 6 through the force of the recoil generated by firing the explosive charge(s) which causes pins 19 to shear and permits barrel(s) 18 to float to the surface and be reused. At the same time, the downward thrust of head 12 causes pins 21 to shear thereby disengaging ring 17 from the upper end of tubular member 6 and come to rest at the lower portion thereof as shown in FIGURE 2. Downward progress of projectile 8 is impeded by the soil. However, the penetration may vary from one location to another. If the soil is hard, penetration is limited but the holding power is proportional to the energy of the charge propelling the projectile downward. The dashpot action of annulus 13—which may be filled with grease or similar material—closing over the upper extremity of member 6 brings the projectile to rest without damage, particularly where the soil is soft. If desired the assembly could be employed without the use of shear plate 22 thereby allowing water to fill annulus 13 whereby a similar braking action is generated on firing projectile 8.

When the projectile begins to decelerate rapidly and finally comes to rest, tubular weight 10 frees itself from the base of projectile head 12 and as a result of the momentum caused by downward movement of projectile 8 travels at a high rate of speed striking slips 24 with a force sufficient to shear pins 28 forcing the slips downwardly, with the aid of coiled spring 30, to engage projectile 8, as shown in FIGURE 2, and hold it stationary with respect to tubular member 6.

While the dimensions of the various elements of my anchor assembly may vary rather widely, assemblies whose components have the following dimensions have proved satisfactory. Gun barrel 18 which is reuseable is about 4 feet long and has an I.D. of 3.46 inches. Steel projectile 8 may be constructed of hollow seamless tubing 2½ inches in diameter, 6 to 8 feet long. Deceleration tube 40 shown in FIGURE 3 is preferably in two sections, the first of which consists of seamless steel tubing, for example, 24 inches in length and 3½ inches O.D. by a ⅛ inch wall. This portion is placed immediately above a second section 12 inches long and having a ¼ inch wall. Such arrangement permits projectile 8 to travel downwardly through the gun barrel at a decelerating rate but still at a reasonably high velocity. The lower, thicker wall section of tube 40 serves to prevent the projectile from passing on through barrel extension 6. Thus, in effect, the wall thickness of deceleration tube 40 is tapered so as to match the taper of head or piston 12. When tapered head 12 enters the bottom 12 inch section of tube 40, projectile 8 decelerates rapidly and with a 60 to 100 gram propellant charge is easily retained within the anchor assembly. If desired, deceleration tube 40 may be corrugated.

With the type of anchor assembly described and claimed herein, it will be noted that the air tank serves a dual function in that it not only lifts the reuseable portion of the apparatus to the surface after the firing operation, but it serves to provide additional reaction force to the barrel when the gun is fired and in this respect is considered to constitute an improvement over my co-pending application Ser. No. 660,526, filed simultaneously herewith.

It will be apparent to those skilled in this art that while the foregoing description deals in detail with a specific form of anchor assembly, it will be recognized that the principle of my invention may be employed in a variety of anchor designs wherein it is desired to secure such anchor to the floor of a body of water by explosive or equivalent means and to retrieve the projectile launching mechanism for reuse.

I claim:

1. An anchor assembly adapted for use on the floor of a body of water having in combination a gun barrel with a closed upper extremity and provided with an internal sliding piston, said barrel having a detachable lower portion, a projectile body integral with said piston, means for driving said projectile from said barrel at a high velocity, means within said lower portion for decelerating said projectile body when the latter has protruded therefrom a predetermined distance, means affixed to the exterior of said lower portion for holding a conduit to said floor, and buoyant means affixed to the upper extremity of said barrel to bring it to the water surface after said projectile has been driven into said floor.

2. The anchor assembly of claim 1 wherein means is provided in said lower portion to prevent upward movement of said projectile body after having been driven into said floor.

3. The anchor assembly of claim 1 in which said deceleration means is a deformable tube positioned within said lower portion.

4. The anchor assembly of claim 3 wherein said piston is tapered so that when said body is driven into said floor, the walls of said deceleration tube are expanded outwardly by said piston whereby a tight fit between said tube and said lower portion is secured.

5. The anchor assembly of claim 4 wherein the wall thickness of said deceleration tube is tapered so as to match the taper of said piston.

6. The anchor assembly of claim 3 wherein the diameter of said piston is such that it rests on top of said deceleration tube causing the latter to collapse by a failure mechanism which produces bellows-like convolutions when said body is driven into said floor.

7. An anchor assembly adapted for use on the floor of a body of water having in combination buoyant means, two spaced gun barrels closed at their upper extremities and affixed to said buoyant means, said barrels having a lower detachable portion and provided with an internal sliding piston, a projectile body in each of said barrels integral with said piston, means for driving said projectile bodies at a high velocity from said barrels, means within said barrels for decelerating said projectile bodies when the latter have protruded therefrom a predetermined distance, and means affixed to the exterior of said lower portion for holding a conduit to said floor.

8. The anchor assembly of claim 7 wherein means is provided at said lower portion of each barrel to prevent upward movement of said projectile body after having been driven into said floor.

9. The anchor assembly of claim 7 in which said deceleration means is a deformable tube positioned within said lower portions and adapted to decelerate when the projectile body in each of said barrels has protruded a predetermined distance from the lower extremities of said lower portions.

10. The anchor assembly of claim 7 wherein an individual firing chamber is provided in the upper extremity of each of said barrels.

11. The anchor assembly of claim 7 in which a common firing chamber is affixed in operating relationship to each of said barrels.

References Cited

UNITED STATES PATENTS

| | | |
|---|---|---|
| 3,170,433 | 2/1965 | Gardiner. |
| 3,222,842 | 12/1965 | Luedloff et al. _____ 52—742 |

MILTON BUCHLER, *Primary Examiner.*

T. M. BLIX, *Assistant Examiner.*